5 Sheets—Sheet 1.

L. J. KNOWLES.

LOOM.

No. 7,785. Reissued July 3, 1877.

WITNESSES;

Thos. G. Dodge
Edwin E. Moore

INVENTOR

Lucius J. Knowles

5 Sheets—Sheet 2.

L. J. KNOWLES.

LOOM.

No. 7,785.

Reissued July 3, 1877.

WITNESSES:

Thos. H. Dodge

Edwin C. Moore

INVENTOR;

Lucius J. Knowles

5 Sheets—Sheet 3.

L. J. KNOWLES.

LOOM.

No. 7,785. Reissued July 3, 1877.

WITNESSES;

Thos. G. Dodge

Edwin E. Moore

INVENTOR;

Lucius J. Knowles

5 Sheets—Sheet 4.

L. J. KNOWLES.

LOOM.

No. 7,785. Reissued July 3, 1877.

WITNESSES;

Thos. B. Dodge

Edwin E. Moore

INVENTOR;

Lucius J. Knowles

5 Sheets—Sheet 5.

L. J. KNOWLES.

LOOM.

No. 7,785. Reissued July 3, 1877.

WITNESSES;

Thos. H. Dodge

Edwin E. Moore

INVENTOR;

Lucius J. Knowles

UNITED STATES PATENT OFFICE.

LUCIUS J. KNOWLES, OF WORCESTER, MASSACHUSETTS.

IMPROVEMENT IN LOOMS.

Specification forming part of Letters Patent No. 134,992, dated January 21, 1873; Reissue No. 7,785, dated July 3, 1877; application filed May 17, 1877.

DIVISION B.

*To all whom it may concern:*

Be it known that I, LUCIUS J. KNOWLES, of the city and county of Worcester and Commonwealth of Massachusetts, have invented certain new and useful Improvements in Looms; and I do hereby declare that the following is a full, clear, and exact description of the same, reference being had to the accompanying drawings, which form a part of this specification, and in which—

Figure 1:
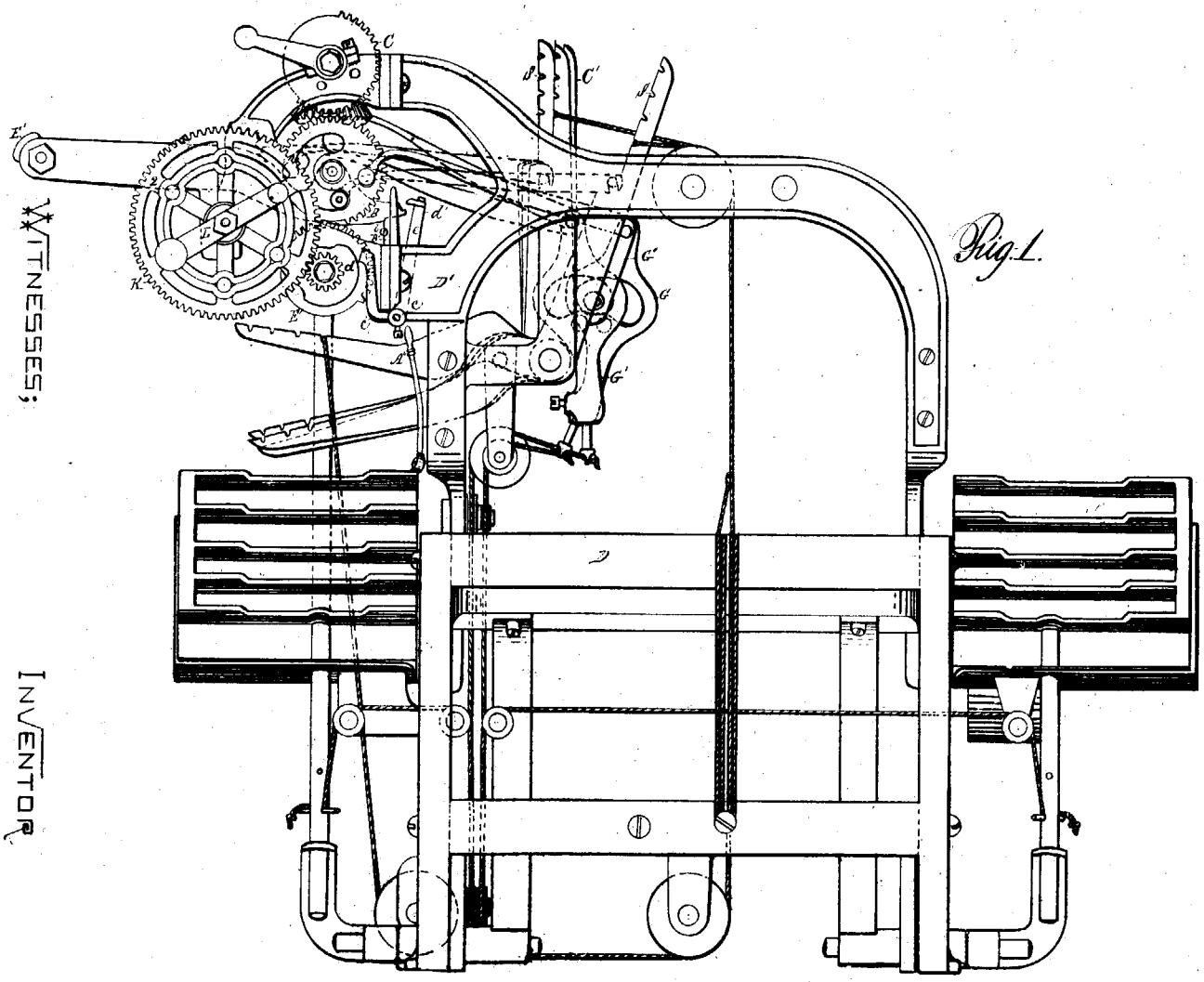
Figure 2:
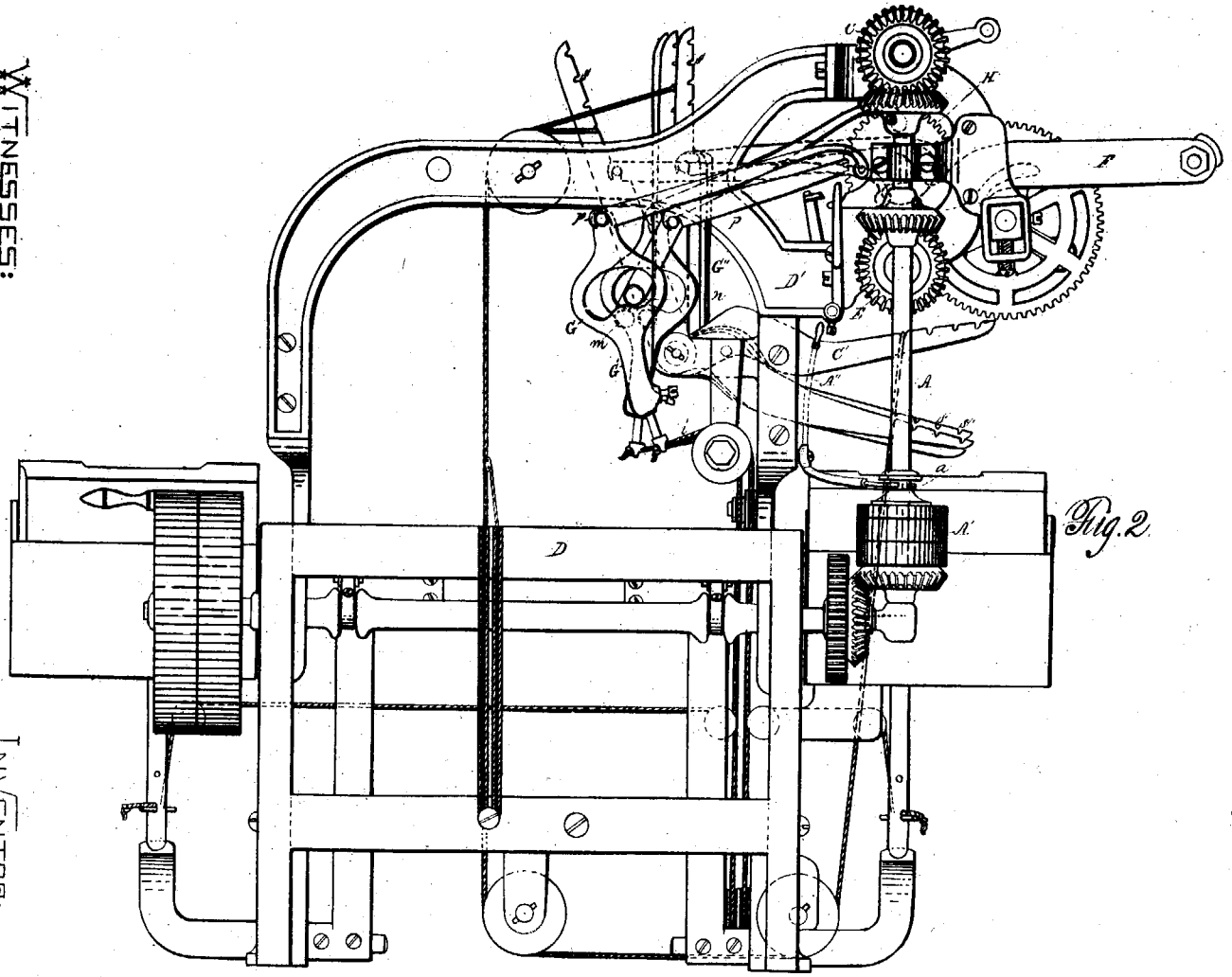
Figure 3:
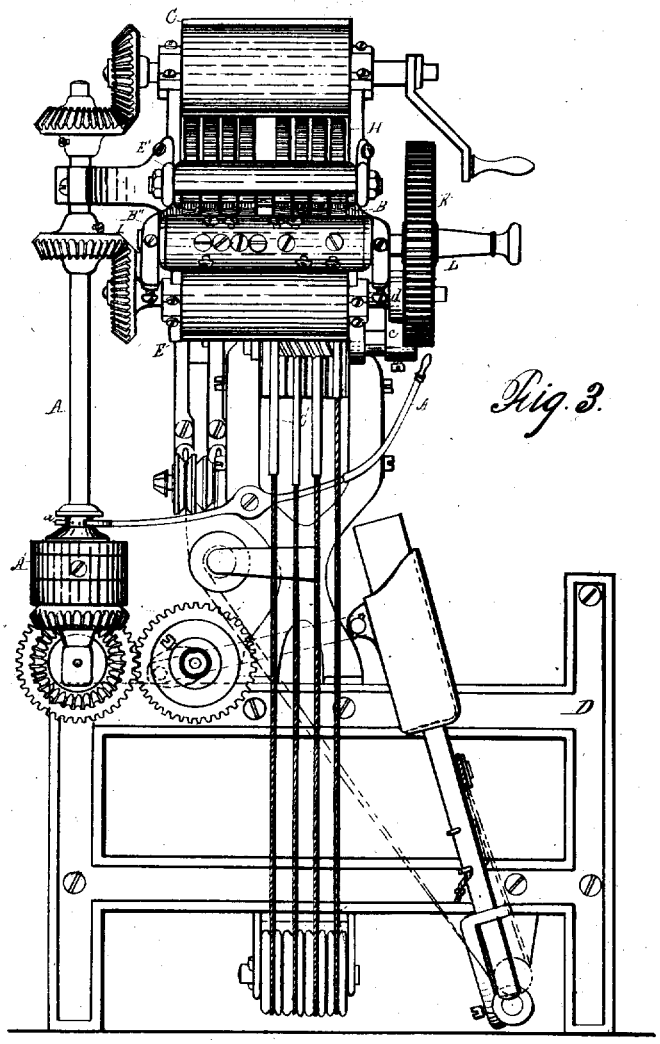
Figure 4:
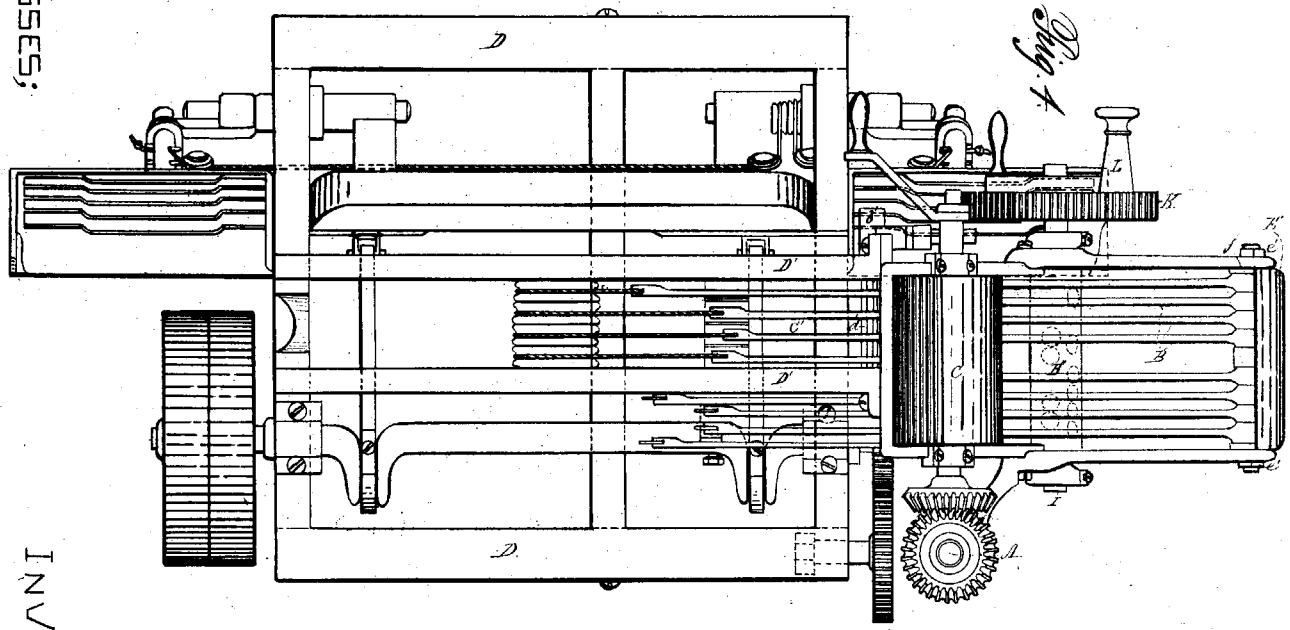
Figure 5:
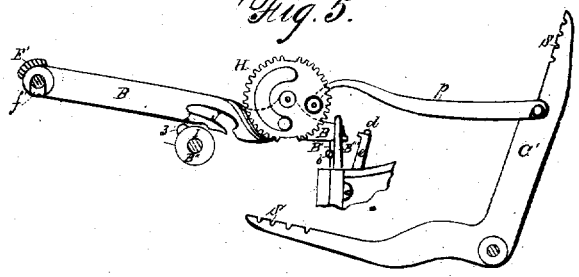
Figure 6:
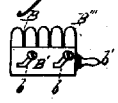
Figure 7:
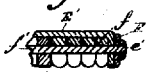
Figure 8:
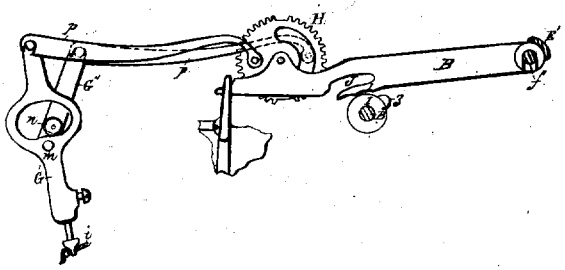

Figure 1 represents a front-side view of my improved loom. Fig. 2 represents a back-side view of the loom. Fig. 3 represents an end of the loom, upon which the harness mechanism is mounted. Fig. 4 represents a top or plan view. Fig. 5 represents views of detached parts of the harness-operating mechanism. Fig. 6 represents a side view of the elevating-plate, by means of which all of the heddles are thrown into one shed, for the purpose hereinafter described. Fig. 7 represents sectional views of the lever-holding device, as hereinafter described; and Fig. 8 represents a side view of the lever for operating the shuttle-boxes.

To enable those skilled in the art to which my invention belongs to make and use the same, I will proceed to describe it more in detail.

That part of my invention which forms the subject matter of this division of reissue relates to a new organization of mechanism for operating the shed-forming mechanism in fancy-looms, and has for its object such a construction of parts, and such a connection between the crank-shaft and the shed-forming devices and their pattern-surface, that the shed-forming devices and pattern-surfaces may be moved to make and perfect sheds while the crank-shaft remains at rest.

The accompanying drawings represent a Knowles fancy-loom, which will be first described, after which that part of my invention referred to above will be specifically claimed.

It often happens that it is necessary to move the harness-motion to find the proper pick when the filling-thread has been broken, run out, or for other causes. To avoid putting in motion the whole loom mechanism when this is done, I combine with shaft A, which gives motion to the harness mechanism, a clutch-hub, A′, having a groove, *a*, into which the forked end of lever A″ is fitted. The other end of said lever extends through to the front of the loom, and is arranged within easy reach of the operator. When, therefore, the operator desires to turn the harness mechanism, as before stated, the front end of lever A″ is depressed and clutch-hub A′ elevated, so that it will be disconnected from the clutch-hub upon the driving-gear below it. Lever A″ may be held down by any suitable catch. The operator can now turn the harness mechanism by means of power applied to any suitable part thereof, and that, too, without turning the mechanism that operates the lay of the loom.

For the purpose of mending threads, picking out imperfect work, and for other reasons, it is very desirable to bring all the heddles, and thereby all the threads, together into one line or plane. This result is produced in my improved loom by a very simple and effective device, as follows: The free ends of the vibrating levers B rest upon the elevating bar or plate B′, Figs. 5 and 6, which is provided with two slots, *b b*, the lower ends of the slots being horizontal, all as fully shown in Fig. 6.

When the operator desires to bring all of the heddles into one line, handle *b′* is grasped and plate B′ is drawn forward, when the said plate, together with the free ends of levers B, will be raised until the horizontal parts of the slots *b b* rest upon the stationary guide screws or pins which pass through said slots, and are fast in the stationary comb B‴, in which the front ends of levers B work. When in this position plate B′ will remain until pushed back, thus holding all of the vibrating levers clear of the pattern-wheel B″, or pattern-chain when one is used. As a result of this change of the parts, the harness-elevating cogged wheel C will bring the upper ends of all the angle-levers C′ forward, where they will remain, all the heddles being raised to the highest point in line with each other. When the weaving is to be renewed the operator pushes plate B′ back to its original place, and the pattern wheel or chain acts again.

It will be understood that by changing the mechanism the line at which the heddles shall meet may be varied.

The operator often has occasion or desires to move the pattern-chain, and should the change be made when the harness-motion is in operation at certain stages, then a serious derangement of the parts would result, as will be understood by those skilled in the art. To guard against such improper movement of the pattern chain or wheel, a safety locking device is employed.

A shaft, *c*, is fitted to turn in suitable bearings in the elevated part D′ of the loom-frame D, and has attached to its outer end a bent arm, *c′*, which is acted upon by a cam, *d*, upon the outer end of the shaft of the harness-depressing cogged wheel E, so as to permit the upper hooked end *d′* of the arm *e*, fastened to shaft *c*, to swing forward over the ends of all the vibrating levers B that are to remain down during the pick for the shed which has been set; consequently the operator cannot turn the pattern chain or wheel until the hooked end *d′* of arm *e* has been turned back by the cam, as shown in the drawing.

When several levers are to be attached to a common fulcrum or spindle, it is quite convenient to have some arrangement whereby each or all of the levers can be removed from their fulcrums for repairs, or for other purposes.

My improvement for accomplishing this purpose is very simple, and yet effective, and it is shown in the drawing in combination with the fulcrum of vibrating levers B, and which improvement consists of a movable cap, E′, with ears *f*, having holes through which the fulcrum-rod *f′* passes, as shown in the drawing. The inner surface of the movable cap E′ is made to conform to the circular ends of the vibrating levers B which it is designed to keep in place, while its ears stand between the ends of the outer levers and the ends of the lever-supporting frame F, whereby the ends of said frame can be screwed or clamped against the ears and ends of the lever-cap E′ by means of nut *e′*, when the cap has been once adjusted, and thus hold it in place without binding the ends of the levers. The ends of the levers are slotted out upon their under sides, so that they can be dropped down upon the fulcrum-rod, as indicated in Fig. 5, after which the cap E′ is turned up over their ends, as shown in the same figure.

If it is desired to withdraw or take out any one or all of levers B, the operator simply loosens nut *e′* and turns cap E′ back, when the rear ends of the levers can be lifted off of the fulcrum-rod. This, it will be noticed, is a good and useful improvement for holding a series of levers in place, and which is susceptible of extensive use.

In the construction of mechanism for operating movable shuttle-boxes much time and money have been spent, and yet this part of a loom is regarded by manufacturers as far from what it ought to be, and I have been led, from the practical difficulties which I have met with as a manufacturer of looms, to combine certain elements heretofore used by me separately in different looms in the loom shown in the drawing, but under different combinations and arrangements, whereby substantial and important advantages are obtained, and the loom rendered far more desirable and useful.

The shuttle-box motion is obtained in this loom by a compound lever, G, Figs. 2 and 8, the longer part, G′, of the lever being hinged or fulcrumed to the lower end of the other part, G″, at *m*, (see dotted lines,) while the latter is fulcrumed at *n*. The upper ends of both of said levers are operated, by means of connecting-arms *p*, from separate gear-cranks H, Fig. 8, connected with the inner ends of two of the vibrating levers B.

By this arrangement a four-motion shuttle-box can be very successfully operated. For instance, the lower end of compound lever G being connected with the shuttle-box frame by cords *i*, or in any other convenient or well-known manner, one of the boxes being in place, the loom is started, when, after the first box has been used, lever part G″ is drawn forward, when the lower end of lever part G′ will be thrown back, and the second shuttle-box raised into position; then the upper end of lever part G′ is drawn forward, thereby throwing its lower end still farther back; but while this is being done, the upper end of lever part G″ is thrown back, thus "discounting one," as it is called—that is, permits only one box, the third being raised into position—whereas, the sweep of lever part G′ would have been sufficient to have raised the fourth box into place but for the back motion of lever part G″. The fourth box is now raised into position by the upper end of lever part G″ being drawn forward.

It will thus be seen that with two compound levers, G, connected to crank-gears H and vibrating levers B, a four-motion shuttle-box can be operated in a very perfect manner, and thus the elements patented to me February 24, 1863, have been combined with those described in the patent granted to me December 13, 1870, in a novel and useful manner.

The pattern-wheel B″ is driven from a gear on the end of the shaft of the depressing-wheel E taking into gear K, loose on shaft I′ of the pattern-wheel, but having countersinks 2, into which springs a catch-bolt in the end of arm L, fast to the end of shaft I′.

By this arrangement the pattern wheel or chain can be moved without moving the harness-motion, since, by withdrawing the spring-bolt on the arm L, it, together with the pattern-wheel, can be revolved without turning gear K. Those skilled in the art will appreciate this improvement, since they will see that this pattern chain or wheel can be adjusted readily.

In the operation of the loom patented to me February 24, 1863, there have been found several practical objections when used in certain kinds of weaving. In the first place, the arrangement of the cranks, toothed crank-wheels, and lifter and depressor wheels, was inconvenient for certain classes of work. Then, again, to obtain the necessary variation in the elevation or depression of the several lines of heddles, the connecting-arms had to be connected to the gear-cranks in different positions, and consequently they had to be all marked or numbered, and each crank and its particular arm had to be placed in a particular position in the loom. This led to a great deal of trouble, since, if the crank-pin happened to be a little out of place, there was trouble; then, when one broke, mistakes were made in selecting or sending for the right one.

These difficulties and others which might be named have been overcome by my present improvements, since I have connected with the loom-frame D an elevated frame, D′, of such construction that the harness and shuttle-box motions, or mechanism for producing such motions, can be located above one end of the loom, and yet within reach of the operator. The gear-cranks, lifting and depressing wheels, occupy horizontal positions, and such, too, that angle-levers C′ can be combined therewith, whereby all the gear-cranks and their connections can be made alike, the difference in positions of the various series of heddles being obtained by means of notches in the angle-levers, and into which notches cords or chains are to be hitched for the purpose of giving motion to the heddles or harnesses with which they are connected, in the usual manner. The under sides of the vibrating levers B, Fig. 5, are made with curved or circular recesses 1, for the purpose of allowing the pattern-wheel B″, after its points or fingers 3 have raised the levers B to the proper height, to continue to move without lowering them, so that they may remain in position until their crank-gears have been operated upon by the elevating cogged wheel. The arms or elevating-levers B are made with slots J, for the purpose of allowing them to spring in case of derangement of the gear-cranks.

Having described my improved fancy-loom, what I claim as my invention, and desire to secure by Letters Patent in this division of reissue, is—

1. A crank-shaft and shed-forming shaft, connected with and adapted to operate shed-forming devices, and the pattern-surface therefor, in combination with a clutch to engage and disengage the crank and shed-forming shafts, to weave, or enable the shed-forming devices and pattern-surface to be moved in unison, and independently of the other parts of the loom, to form sheds and find a true shed, while the crank-shaft remains at rest.

2. A shedding-shaft and shedding mechanism, and its pattern-surface, connected therewith, and situated at the same end of the loom, in combination with a clutch adapted to disengage the shedding-shaft from the control of the crank-shaft, to permit the shedding-shaft to operate and form sheds without moving the crank-shaft.

3. A shedding-shaft adapted to be connected with or disconnected from the control of the lay or crank-shaft, in combination with and adapted to operate a rotary pattern-surface and shed-forming devices to find a true shed.

4. Shed-forming devices and a pattern-surface therefor, and crank-shaft, and mechanism connected with and adapted to operate the shedding devices and pattern-surface by the movement of the crank-shaft, in combination with a clutch adapted to be disengaged from the control of the crank-shaft, to permit the shedding devices and pattern-surface to be moved in unison and independently of the other parts of the loom, while the crank-shaft remains at rest.

LUCIUS J. KNOWLES.

Witnesses:
THOS. H. DODGE,
EDWIN E. MOORE.